United States Patent [19]

Yamaguchi

[11] 4,318,385
[45] Mar. 9, 1982

[54] EXHAUST GAS RECIRCULATION CONTROL SYSTEM

[75] Inventor: Hiroshi Yamaguchi, Yokohama, Japan

[73] Assignee: Nissan Motor Co., Ltd., Yokohama, Japan

[21] Appl. No.: 138,571

[22] Filed: Apr. 8, 1980

[30] Foreign Application Priority Data

Apr. 10, 1979 [JP] Japan .................................. 54-43550

[51] Int. Cl.³ ............................................. F02M 25/06
[52] U.S. Cl. ................................................... 123/571
[58] Field of Search ........................................ 123/571

[56] References Cited

U.S. PATENT DOCUMENTS

| | | | |
|---|---|---|---|
| 4,170,973 | 10/1979 | Nohira et al. | 123/571 |
| 4,171,691 | 10/1979 | Nohira et al. | 123/571 |
| 4,177,777 | 12/1979 | Maruyama et al. | 123/571 |
| 4,186,703 | 2/1980 | Haka et al. | 123/571 |
| 4,195,531 | 4/1980 | Okamura | 123/571 X |
| 4,210,112 | 7/1980 | Nakamura et al. | 123/571 |

Primary Examiner—Wendell E. Burns
Attorney, Agent, or Firm—Schwartz, Jeffery, Schwaab, Mack, Blumenthal & Koch

[57] ABSTRACT

An exhaust gas recirculation control system for an internal combustion engine comprises a pressure detector responsive to exhaust gas pulsations for detecting pressure in an exhaust gas recirculation passage which is closely associated with an exhaust gas recirculation flow rate to detect any deviation of the detected pressure from a desired value previously determined depending upon the engine operating conditions and thereby to control the exhaust gas recirculation flow rate in a feed-back control so as to eliminate any deviation in pressure.

9 Claims, 5 Drawing Figures

EXHAUST GAS RECIRCULATION CONTROL SYSTEM

BACKGROUND OF THE INVENTION

1. Field of the Invention

The present invention relates to an exhaust gas recirculation control system for an internal combustion engine.

2. Description of the Prior Art

In order to control an exhaust gas recirculation system so as to obtain an optimum exhaust gas recirculation rate according to an engine operating condition, one means as shown in FIG. 1 has been suggested.

In FIG. 1, an engine 1 comprises an intake duct 2 and an exhaust duct 3, these ducts being connected by an exhaust gas recirculation passage 5 for recirculating part of an exhaust gas downstream of an intake throttle valve 4.

For the purpose of controlling the exhaust gas recirculation rate depending upon the engine operating condition, a control valve 6 is provided in the recirculation passage 5. Control valve 6 is adapted to be controlled by negative operating pressures which are adjusted by means of a solenoid valve 8 adapted to be responsive to signals from a control circuit 7 including a micro computer.

A part of the intake negative pressure downstream of the intake throttle valve 4 is introduced into a constant pressure valve 10 to produce therein a constant negative pressure. The constant negative pressure is mixed with the air or atmosphere introduced in the solenoid valve 8 which receives the air depending upon its opening degree to produce a control negative pressure which is supplied to a diaphragm drive 9 of the control valve 6. As the negative degree of the control negative pressure increases, the opening degree of the control valve 6 increases and therefore the exhaust gas recirculation flow rate also increases.

The control circuit 7 includes an interface, a microprocessor, a read only memory (ROM) and a random access memory (RAM). Signals representative of operating conditions of the engine from, for example, an engine revolution sensor 11, an intake air flow sensor 12 or a throttle valve open degree switch 13 are supplied to the control circuit 7 which selects an exhaust gas recirculation rate previously set corresponding to the engine operating condition on the basis of the received signals to produce a pulse signal which is supplied to the solenoid valve 8 to obtain a desired recirculation rate.

With this system, therefore, the exhaust gas recirculation can be controlled with a high accuracy to an extent such that both a driving performance and exhaust gas condition (NOx reduction effect) required for the engine are brought under satisfactory conditions.

When first installed this system operates with a high degree of accuracy. However, it unavoidably encounters the problem of changes due to aging. The accuracies of the solenoid valve 8 and constant pressure valve 10 become lower as time passes which cause delicate errors in controlling the exhaust gas recirculation which make it difficult to maintain the stable control performance.

SUMMARY OF THE INVENTION

It is an object of the invention to provide an improved exhaust gas recirculation control system which eliminates the disadvantages of the prior art.

It is a further object of the invention to provide an exhaust gas recirculation control system comprising pressure detecting means responsive to exhaust gas pulsations for detecting pressure in an exhaust gas recirculation passage, which is closely associated with the exhaust gas recirculation flow rate to control the recirculation flow rate in a feed-back control so as to eliminate any deviation of the detected pressure from a desired value previously determined.

The exhaust gas recirculation control system according to the invention comprises a throttle means arranged in an exhaust gas recirculation passage for reintroducing part of the exhaust gas into the intake air flow for an engine, a control valve for controlling exhaust gas recirculation flow rate, pressure detecting means for detecting pressure downstream of said throttle means, operating condition detecting means for detecting operating conditions of the engine, and a control circuit for controlling said control valve to make said pressure downstream of said throttle means equal to a value previously determined depending upon the operating condition of the engine, thereby feed-back controlling the exhaust gas recirculation flow rate.

In order that the invention may be more clearly understood, preferred embodiments will be described, by way of example, with reference to the accompanying drawings.

DETAILED DESCRIPTION OF THE PREFERRED EMBODIMENT

Figure 1:
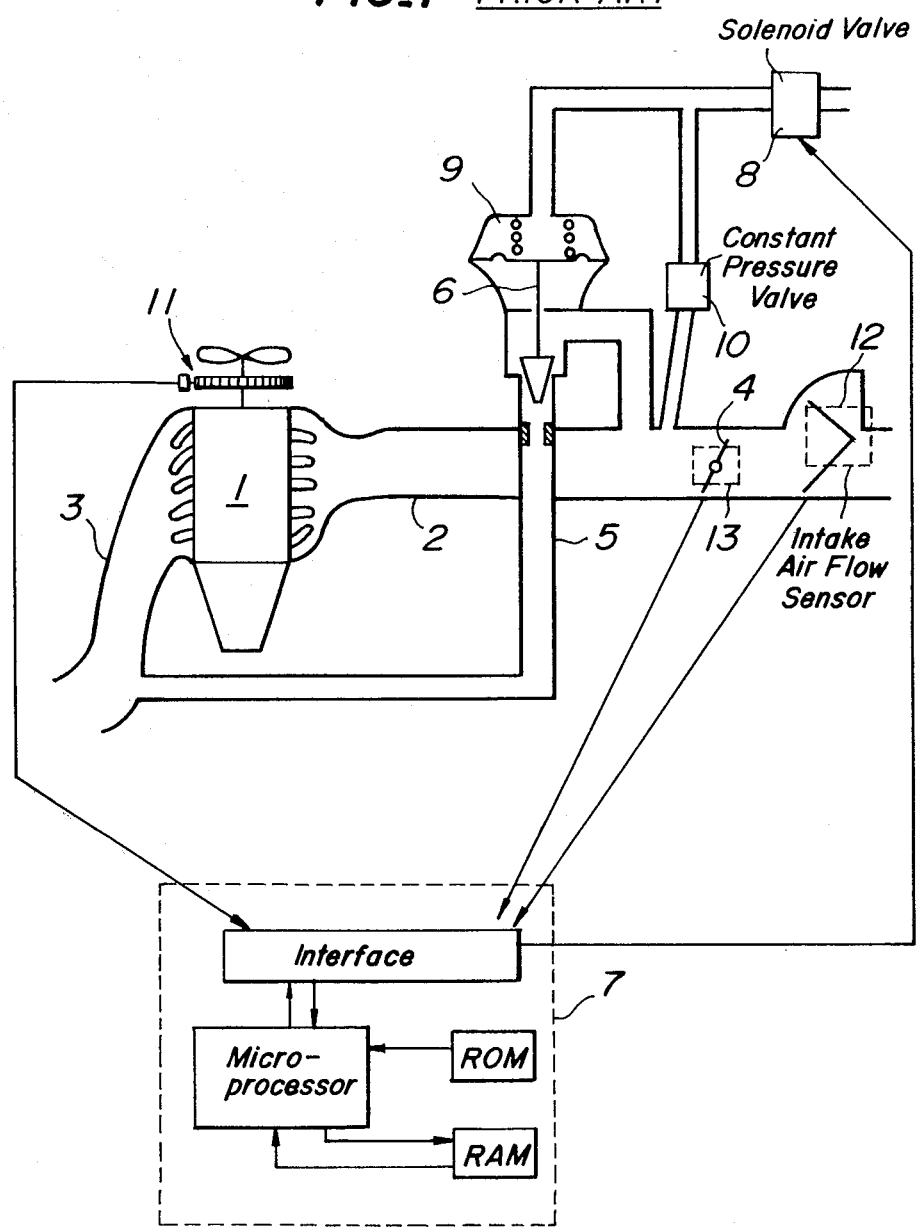
FIG. 1 is a diagrammatic view of an arrangement of the prior art as mentioned above.
Figure 2:
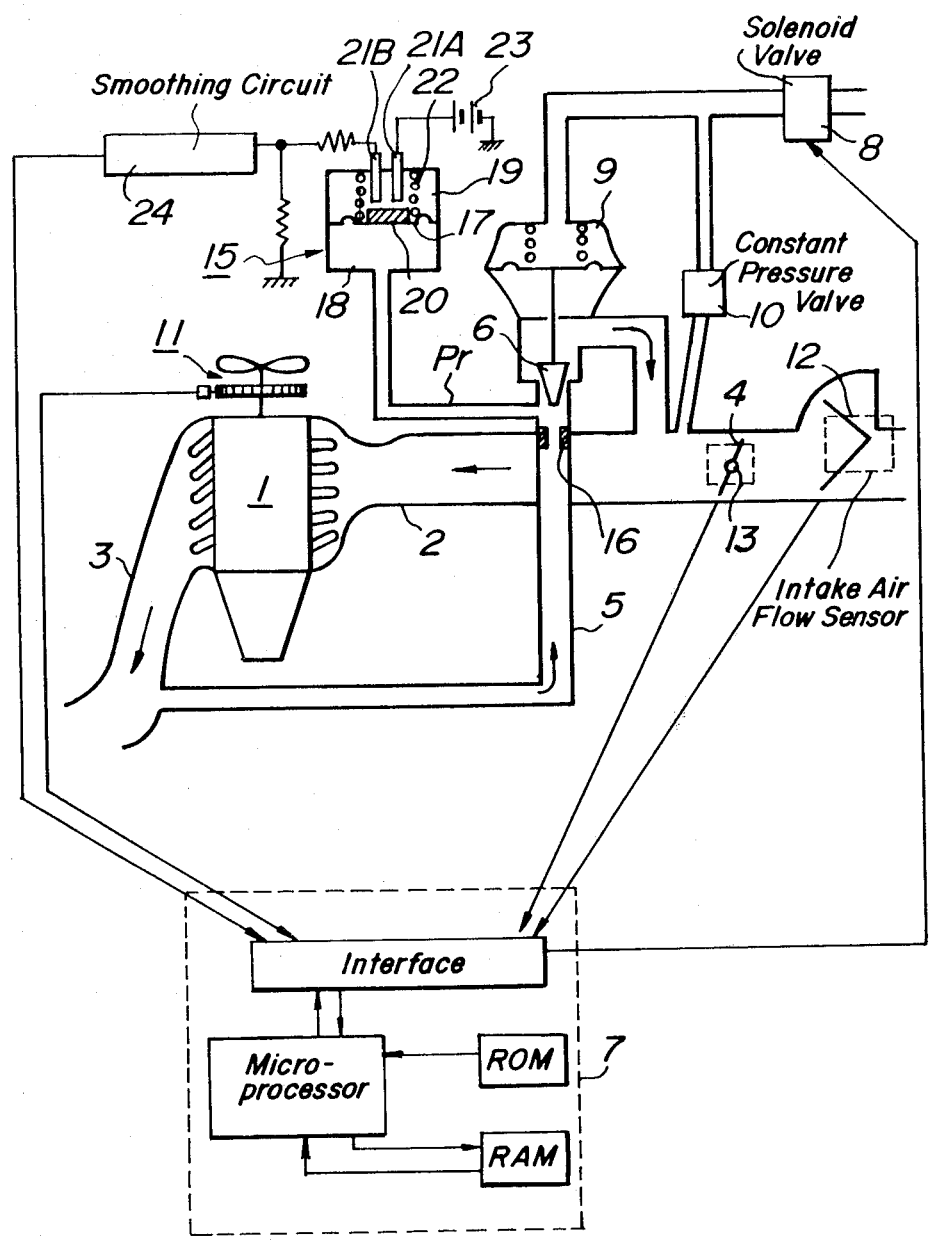
FIG. 2 is a diagrammatic view of the system according to the present invention.

Referring to FIG. 2 wherein one embodiment of the present invention is shown, like components have been designated by the same reference numerals as in FIG. 1, which will not be described in further detail.

According to the invention, a pressure detector 15 is provided for measuring exhaust gas recirculation flow rate, whose detected values are fed-back to the circuit 7 to perform a control for deleting any deviation from the desired controlled values.

The pressure Pr in a passage between the control valve 6 and throttle means or an orifice 16 for governing the flow rate in the exhaust gas recirculation passage 5 is in very close relation to the exhaust gas recirculation flow rate.

In other words, the pressure upstream of the orifice is approximately constant and substantially equal to the exhaust gas pressure of the engine, so that by detecting the pressure Pr downstream of the orifice the flow rate through the orifice 16 can be measured with the aid of the orifice opening area previously known.

The pressure detector 15 for this purpose comprises a diaphragm 17 to define a pressure chamber 18 and an atmospheric chamber 19 in the detector. To the diaphragm 17 is secured a conductive switch plate 20 adapted to be in contact with and separated from terminals 21A and 21B arranged extending in the atmospheric chamber 19.

When the diaphragm 17 is raised against a force of a spring 22 until the switch plate 20 becomes in contact with the terminals 21A and 21B, they are short-circuited to cause an electric current to flow from a power source 23 to a smoothing circuit 24.

The pressure Pr downstream of the orifice to be transmitted to the pressure chamber 18 pulsates in synchronism with the revolutions of the engine so that the diaphragm 17 also vibrates in response to the pulsations of the pressure Pr. The higher the pressure Pr, the higher the reference level of the vibration becomes and therefore the short-circuited rate of the terminals 21A and 21B increases.

The smoothing circuit 24 serves to correct these outputs in the form of on-off to a mean output value. In this manner as the pressure Pr downstream of the orifice becomes higher, the output voltage from the smoothing circuit 24 becomes higher.

On the other hand, in the circuit 7 the desired exhaust gas recirculation flow rate is determined based on output from the engine revolution sensor 11, intake air flow sensor 12 or throttle valve open degree sensor 13 in the same manner as in FIG. 1. Pulse signals having duty factors corresponding to the determined or selected values are fed from the circuit 7 to the solenoid valve 8.

The negative pressure from the constant pressure valve 10 is mixed with the air passing through the solenoid valve 8 whose volume substantially corresponds to the open degree of the solenoid valve 8 to obtain a controlled negative pressure. When the controlled negative pressure is fed to the control valve 6, its open degree is increased or decreased in response to the controlled negative pressure, thereby controlling the pressure Pr downstream of the orifice 16 and hence the recirculation flow rate.

The pressure Pr is fed-back to the control circuit 7 via the pressure detector 15 and smoothing circuit 24, so that a deviation of the pressure Pr can be immediately found if an actual exhaust gas recirculation flow rate deviates from the desired value notwithstanding that a signal for obtaining the desired value has been fed to the solenoid valve 8. The control circuit 7 performs an arithmetic operation to obtain a correction value for detecting the deviation of the actually measured value from the desired value, so that a corrected value which is the desired value plus the correction value is fed to the solenoid valve 8 and an exhaust gas recirculation flow rate resulting from the correction value is then detected to correct a deviation, if any, repeatedly. In this manner, the exhaust gas recirculation flow rate would approach the desired value with a high accuracy.

Figure 3A:
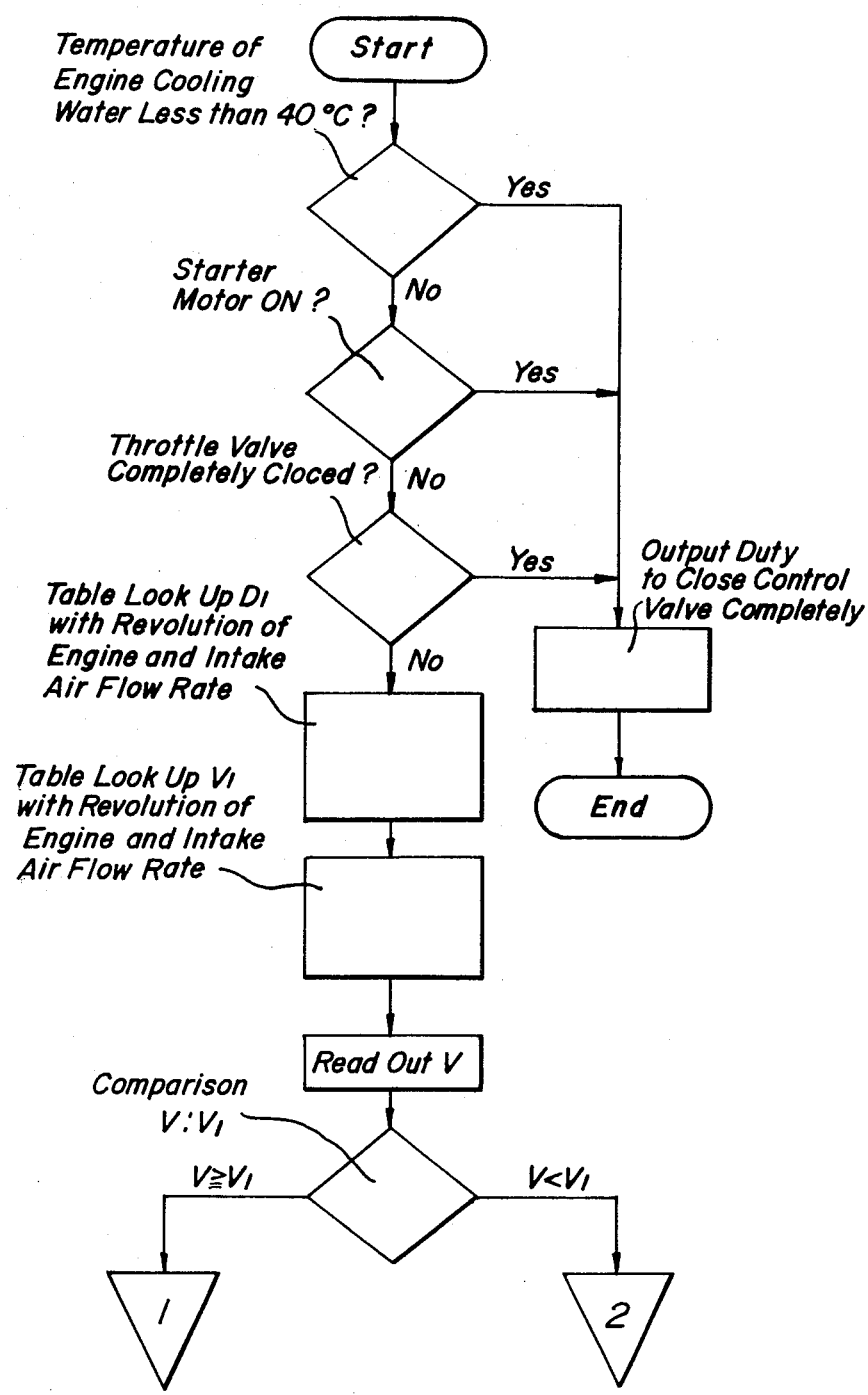
FIGS. 3a and 3b are flow charts of control circuits used in the present invention.
Figure 3B:
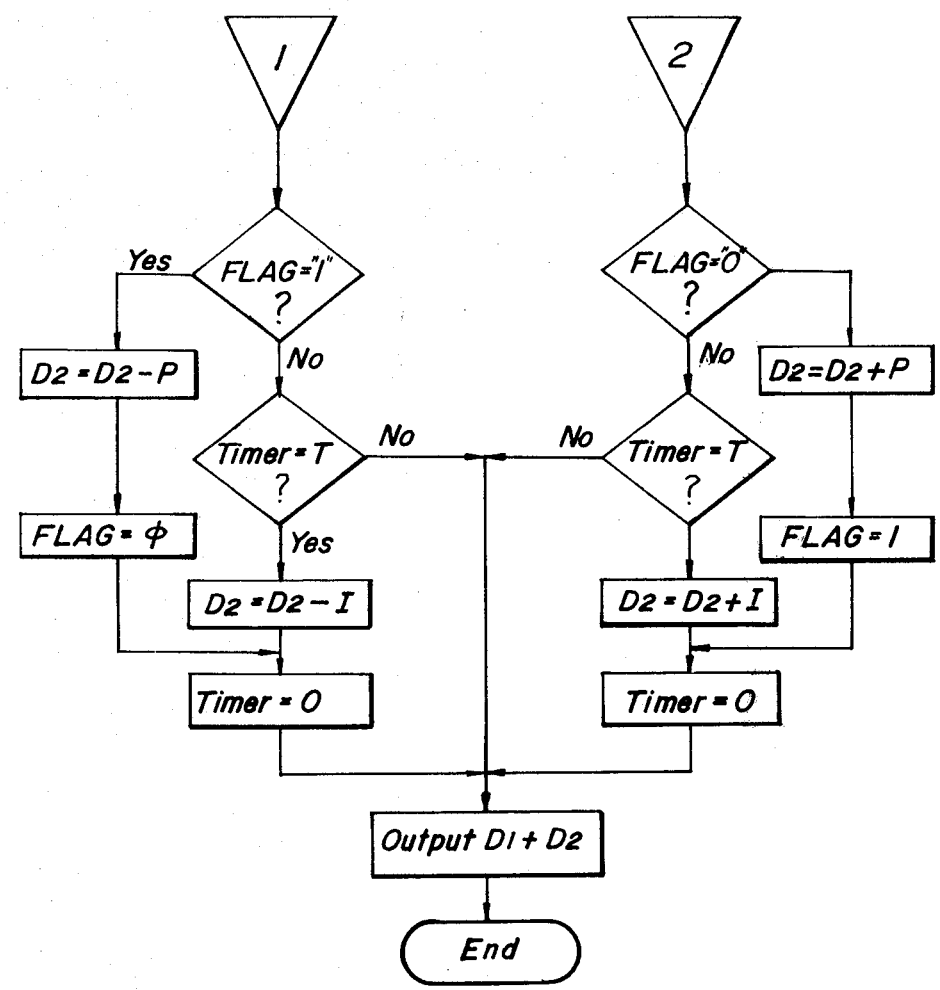

The control of these operations with the aid of a computer will be explained with reference to flowcharts shown in FIGS. 3a and 3b.

Experiments are carried out to previously determine duties $D_1$ of drive signals of the solenoid valve 8 for obtaining optimum exhaust gas recirculation flow patterns corresponding to conditions of an engine operation and output voltages $V_1$ of the pressure detector 15 corresponding to the pressures Pr downstream of the orifice under the above conditions.

The conditions of the engine operation depend upon the revolutions n of the engine and intake air flow rate TP per one revolution. The duties $D_1$ of the signals and output voltages $V_1$ are stored in two two dimensional tables having parameters of N and TP.

In starting the engine, when it is decided that the exhaust gas recirculation should not be effected judging from the temperature of engine cooling water lower than a determined value or output signals of a starter motor and signals from a throttle valve open degree switch, a duty is fed to the solenoid valve 8 for completely closing the control valve 6. If the temperature of the engine cooling water is higher than the determined value, the exhaust gas recirculation should not be effected in the event that the starter motor is operating or the throttle valve is closed, if the starter motor is operating.

Then an actual revolution N of the engine and intake air flow rate are detected to obtain the intake air flow rate per one revolution of the engine TP by an arithmetic operation, and a duty $D_1$ of the signal from the solenoid 8 and an output signal $V_1$ of the pressure detector 15 are obtained by table look up.

The output signal $V_1$ is then compared with an actual output V of the pressure detector 15 (exactly the output of the smoothing circuit 24) and its results are indicated in a flag.

The flag is provided for greatly varying the correction duty $D_2$ of the drive signal of the solenoid valve 8 by a value P only when the intensities of V and $V_1$ are reversed for the purpose of improving the response of the solenoid valve 8. Two inverted isosceles triangles at the bottom of FIG. 3a and the top of FIG. 3b are only symbols for connecting FIGS. 3a and 3b.

If the voltage V is more than or equal to $V_1$, the flag indicates "0". If V is less than $V_1$, the flag indicates "1". However, when the relation between V and $V_1$ is changed from $V<V_1$ to $V<V_1$ (corresponding to points A and C in FIG. 4), the flag indicates "0" even when the relation is $V<V_1$, so that it indicates the fact that the values V and $V_1$ have crossed or have been equal immediately before the moment.

Figure 4:
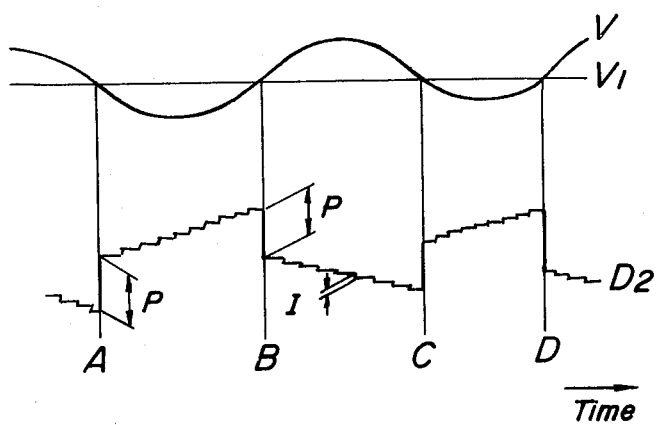
FIG. 4 is a time chart illustrating the relations between the pressure signal V, desired pressure signal $V_1$ and correction duty $D_2$.

If the flag indicates "1" when $V<V_1$, it shows that the values V and $V_1$ have crossed or have been equal immediately before (corresponding to points B and D in FIG. 4). In order to make the value V smaller to be close to $V_1$, that is, to increase the exhaust gas recirculation flow rate to lower the pressure Pr, the correction duty $D_2$ of the drive signal of the solenoid valve 8 is greatly decreased to $D_2-P$ and then added to $D_1$ looked up. The added resultant is outputted and the flag indicates "0".

If the flag indicates "0" when $V<V_1$ (between the points B and C), the duty $D_2$ is decreased by I (shown in FIG. 4) every constant period T of time and $D_1+D_2$ is outputted.

If the flag indicates "0" when $V<V_1$ (the points A and C in FIG. 4), the duty $D_2$ is increased by P to $D_2+P$. The increased duty is added to $D_1$ and the added duty is outputted to change the indication of the flag to "1". If the flag indicates "1" when $V<V_1$ (between the points A and B and between the points C and D), the duty $D_2$ is increased by I every constant period T of time and $D_1+D_2$ is outputted.

In other words, with the aid of the feed back control the correction duty $D_2$ is greatly changed to improve a transition response of the system when the values of V and $V_1$ have crossed (the value of $V-V_1$ has been changed from plus to minus or vice versa) or under the other conditions the correction duty $D_2$ is changed step by step every constant period of time to realize a stable characteristic of the system to suppressing hunting in operation.

As can be seen from the above description, the exhaust gas recirculation control system according to the invention operates to control the exhaust gas recirculation with very high accuracies with a high stability for a long period of time because of the correction with the aid of the feed back operation even if a solenoid valve or constant pressure valve has aged.

It is further understood by those skilled in the art that the foregoing description is the preferred embodiment of the disclosed system and that various changes and modifications may be made in the invention without departing from the spirit and scope thereof.

What is claimed is:

1. In an exhaust gas recirculation control system for controlling exhaust gas recirculation which reintroduces part of an exhaust gas into intake air for an engine, said system including a control valve for controlling exhaust gas recirculation flow rate, operating condition detecting means for detecting operating conditions of the engine, and a control circuit for controlling said control valve depending upon the operating conditions detected by said operating condition detecting means, the improvement comprising:
    throttle means arranged in an exhaust gas recirculation passage, and pressure detecting means for detecting pressure downstream of said throttle means, wherein said control valve is controlled by said control circuit such that the detected pressure downstream of said throttle means is compared to a target value which is predetermined depending upon the operating conditions of the engine, thereby feedback controlling the exhaust gas recirculation flow rate.

2. An exhaust gas recirculation control system as set forth in claim 1, wherein a valve responsive to negative pressure is used as said control valve for controlling said exhaust gas recirculation flow rate and a solenoid valve is provided for controlling part of an intake negative pressure of the engine by mixing it with the atmosphere to obtain and supply operating negative pressure to said control valve.

3. An exhaust gas recirculation control system as set forth in claim 1, wherein a pulsation detection type pressure detector is provided for detecting said pressure downstream of said throttle means.

4. An exhaust gas recirculation control system as set forth in claim 3, wherein said pressure detecting means comprises a diaphragm to define an atmospheric chamber and a pressure chamber communicating with downstream of said throttle means, terminals extending in said atmospheric pressure chamber and a conductive switch plate secured to said diaphragm on the side of said atmospheric pressure chamber and normally separated from said terminals but brought into contact with said terminals when the diaphragm is moved in response to a pressure rise in said pressure chamber.

5. An exhaust gas recirculation control system as set forth in claims 1, 2, 3 or 4, wherein said throttle means consists of an orifice.

6. An exhaust gas recirculation system for an engine, said engine including an intake manifold, an exhaust manifold, and a throttle valve, said system comprising:
    an exhaust gas recirculation passage for introducing a portion of exhaust gas from said exhaust manifold into intake air for said engine in said intake manifold;
    a control valve for controlling exhaust gas recirculation flow, said control valve being operatively connected to said passage;
    an air intake flow sensor disposed in said intake manifold for producing a signal indicative of air intake flow rate;
    an engine speed sensor for producing a signal indicative of the rotational speed of said engine;
    throttle means arranged in said recirculation passage for restricting flow through said passage;
    pressure detecting means for producing a signal indicative of pressure in said passage downstream of said throttle means; and
    control means for receiving said flow sensor signal and said speed sensor signal and producing a pressure reference signal in dependence thereon; and comparing said pressure reference signal to said pressure detecting means signal and controlling said control valve in response to said flow sensor signal, said speed sensor signal, and said comparison of said pressure reference signal and said pressure detecting means signal.

7. The system as set forth in claim 6, wherein said control means includes look-up means for storing a plurality of predetermined reference pressure signals.

8. The system as set forth in claim 7, wherein said control means comprises a microcomputer.

9. The system as set forth in claim 8, wherein said pressure detecting means comprises a diaphragm to define an atmospheric chamber and a pressure chamber communicating with said passage downstream of said throttle means, and terminals extending into said atmospheric pressure chamber, said diaphragm containing a conductive plate exposed to said atmospheric pressure chamber, said diaphragm being movable between a first position in which said plate is separated from said terminals and a second position in which said plate is brought into contact with said terminals, said diaphragm being movable between said first and second positions in response to a pressure in said pressure chamber.

* * * * *